United States Patent
Namait et al.

(10) Patent No.: US 7,299,223 B2
(45) Date of Patent: Nov. 20, 2007

(54) SPREADSHEET TO SQL TRANSLATION

(75) Inventors: Aman Namait, Redwood Shores, CA (US); Allison Waingold, Sunnyvale, CA (US); Martin Roth, Ashland, MA (US); Andrew Witkowski, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 566 days.

(21) Appl. No.: 10/893,547

(22) Filed: Jul. 15, 2004

(65) Prior Publication Data

US 2005/0039114 A1 Feb. 17, 2005

Related U.S. Application Data

(60) Provisional application No. 60/487,685, filed on Jul. 16, 2003.

(51) Int. Cl.
G06F 17/30 (2006.01)
G06F 17/00 (2006.01)
(52) U.S. Cl. .............................. 707/4; 707/3; 707/101
(58) Field of Classification Search ...................... None
See application file for complete search history.

(56) References Cited

U.S. PATENT DOCUMENTS

| 6,385,604 | B1 | 5/2002 | Bakalash et al. |
| 6,631,497 | B1 | 10/2003 | Jamshidi et al. |
| 2005/0187952 | A1 | 8/2005 | Werner |

OTHER PUBLICATIONS

Witkowski et al. ("Spreadsheets in RDBMS for Olap", ACM, Jun. 2003, pp. 52-63).*

Oracle User's Guide, Release 6.3, Oct. 1999, Part No. A73223_01, Oracle Express Spreadsheet Add-In (42 pgs).

Hyperion Solutions Corporation, "Hyperion Analyzer Release 6.5, Managing OLAP and Relational Data with SQL Queries" (2003) (33 pgs).

SAP, "SAP and Microsoft announce their first joint product. Microsoft and SAP: Revolutionizing How Information Workers Access Enterprise Business Applications" http://www.sap.com/solutions/mendocino/index.epx, printed Jul. 19, 2005 (2 pgs).

Microsoft Office, "Mendocino Version 1.0 (features, functionality and timing of the release can change without notice) Improve the efficiency of your organization's decision making process, utilize and interact with SAP data, seamlessly participate in best-practice mySAP ERP processes—all from a familiar Microsoft Office Professional 2003 user Interface" (2 pgs).

(Continued)

*Primary Examiner*—Joon Hwan Hwang
(74) *Attorney, Agent, or Firm*—Young Law Firm, P.C.

(57) ABSTRACT

Users can create computational models in a spreadsheet application and automatically apply the model to data stored in a relational database. By importing a sample of the data from a database table into the spreadsheet application, users can build spreadsheet models that perform analysis and computations on the sample data. Once the model is complete, the spreadsheet model is translated into an SQL format model understood by the database. The SQL model can operate on the entire data set in the database, rather than just the sample data used to construct the model. The SQL model and its associated data are stored in the database, and the model can be executed on a different sets of data. A web browser based front-end allows model users to access the SQL model via a web browser, eliminating the need for model users to have a spreadsheet application.

20 Claims, 4 Drawing Sheets

OTHER PUBLICATIONS

"Providing Microsoft-SAP Technical Guidance", http://www.microsoft-sap.com/technology/aspx, printed Jul. 19, 2005 (1 pg).

"Introducing the Microsoft Office Information Bridge Framework", http://msdn.microsoft.com/office/understanding/ibframework/gettingstarted/default.aspx?p. . . , printed Jul. 19, 2005 (10 pgs).

"SAPGenie.com -> Interfaces -> Interfaces -> The Mendocino Project", http://www.sapgenie.com/interfaces/mendocino.htm, printed Jul. 19, 2005 (2 pgs).

Witkowski, Andrew et al.; "Business Modeling Using SQL Spreadsheets"; 2003, *Proceedings of the 29th VLDB Conference*, pp. 1-4.

\* cited by examiner

SPREADSHEET TO SQL TRANSLATION

CROSS-REFERENCE TO RELATED APPLICATIONS

This application claims priority to U.S. Provisional Patent Application No. 60/487,685, entitled "Spreadsheet to SQL Translation" and filed Jul. 16, 2003, and incorporates by reference this provisional patent application for all purposes.

BACKGROUND OF THE INVENTION

The present invention relates to the field of software applications generally, and specifically to the implementation of financial applications. Enterprise businesses store large amounts of financial data in relational databases and analysis models in spreadsheet programs, like Microsoft Excel. Enterprise business often need to analyze the data in their database. Financial models are widely used in businesses to evaluate business transactions, project feasibility, management decisions, and potential sales or purchases.

One standard technique for performing data analysis is to import data from a relational database into a spreadsheet to create analytical models and reports. Spreadsheet applications are relatively simple to learn and are widely used by businesspeople for a variety of applications. Despite their advantages, spreadsheet-based financial models have numerous limitations:

Data may change in the relational database due to transactions. Each time data in the database changes, the data must be reimported to spreadsheet so that the model reflects the new data. Additionally, the financial data often needs to be transformed or summarized from its from its native form in the database into a format used by the spreadsheet model. This process of transforming and importing is not only time consuming but often requires additional programming.

Spreadsheet programs typically have a limit on the amount of data that can be imported and manipulated. For instance, Microsoft Excel only allows 65535 rows of data. This is far smaller than the amount of data that may potentially reside in a relational database table, which can have millions of rows of data. For large data sets, users cannot operate spreadsheet models directly on raw transactional data.

There is no centralized repository for models, so spreadsheets may be segmented and isolated throughout a company. They may be lying around on file servers, local disks, emails, etc and they are difficult to manage. There is no way to separate out the logic in terms of the computational model of the spreadsheet represented by formulas from its data content.

There are no programs that automatically map the free-form spreadsheet view of data into the more structured format of a relational database.

Model designers have no control over users changing the computation model.

Each user of a spreadsheet model must have their own licensed copy of the spreadsheet application, making it very expensive to deploy models to a large number of users.

To combat these problems, analysis tools have been created that allow users to model analyses on relation databases, outside of a spreadsheet program. However, this requires a user to learn to use a new tool which is much more complex than a spreadsheet.

It is desirable to develop a system for creating financial models that combines the ease of use of spreadsheet-based models with the full capabilities of a relational database. It is further desirable for the resulting model to be able to be rapidly and inexpensively distributed to model users and to store model data values for analysis by managers and model designers.

BRIEF SUMMARY OF THE INVENTION

The invention allows users to create computational models in a spreadsheet application using a familiar language/tool on data stored in a relational database. A user can import a sample of the data from a database table into the spreadsheet application. Users can then build spreadsheet models that perform analysis and computations on the sample data. Once the model is complete, the spreadsheet model can be translated into an SQL format model understood by the database. The SQL model can operate on the entire data set in the database, rather than just the sample data used to construct the model. The SQL model and its associated data are stored separately in the database, allowing the model to be executed on a different set of data. In a further embodiment, a web browser based front-end allows model users to access the SQL model via a web browser, eliminating the need to purchase large numbers of spreadsheet licenses.

The invention has the advantages of the ease of use associated with using spreadsheet applications to build models combined with the capabilities of a relational database to operate on large data sets. During model construction, users can quickly model computations on small sets of data to ensure the model is operating correctly and then automatically scale the model to large data sets when the model is complete. As the SQL model operates directly on the data in the database, there is no need for any time-consuming importation of large volumes of data or data conversion. Storing the model in the database allows for a centralized repository of models and model data. Further, model designers can prevent users from changing the model.

In an embodiment, a system for implementing a spreadsheet model in a database comprises a modeling module adapted to interface with a spreadsheet application and to retrieve a set of sample data from a database. The set of sample data corresponds with a portion of a full data set within the database. A persistence module adapted to interface with the spreadsheet application and to store a set of spreadsheet operations referencing the set of sample data in the database. A translation module adapted to translate the set of spreadsheet operations into a model database query, such that the model database query performs the set of spreadsheet operations on a full data set in the database.

In a further embodiment, the translation module is further adapted to store the model database query in the database. In another embodiment, the modeling module is adapted to associate a name and a database query specifying the full data set within the database with the set of sample data. In an additional embodiment, the system includes a web front-end adapted to create a web page from the results of the model database query on the database. The web page includes a user interface adapted to collect input data from a model user. In still another embodiment, an instance generator is adapted to create an instance of the model from the model database query and to store the instance of the model and the input data in the database.

In an additional embodiment, the set of spreadsheet operations include a reference to the name associated with the set of sample data, and the translation module is further adapted to match the name associated with the set of sample data with the database query specifying the full data set. The translation model then creates a model database query applying the set of operations to the full data set specified by the database query. In yet another embodiment, the model database query is an SQL spreadsheet rule.

BRIEF DESCRIPTION OF THE DRAWINGS

The invention will be described with reference to the drawings, in which.

DETAILED DESCRIPTION OF THE INVENTION

Figure 1:
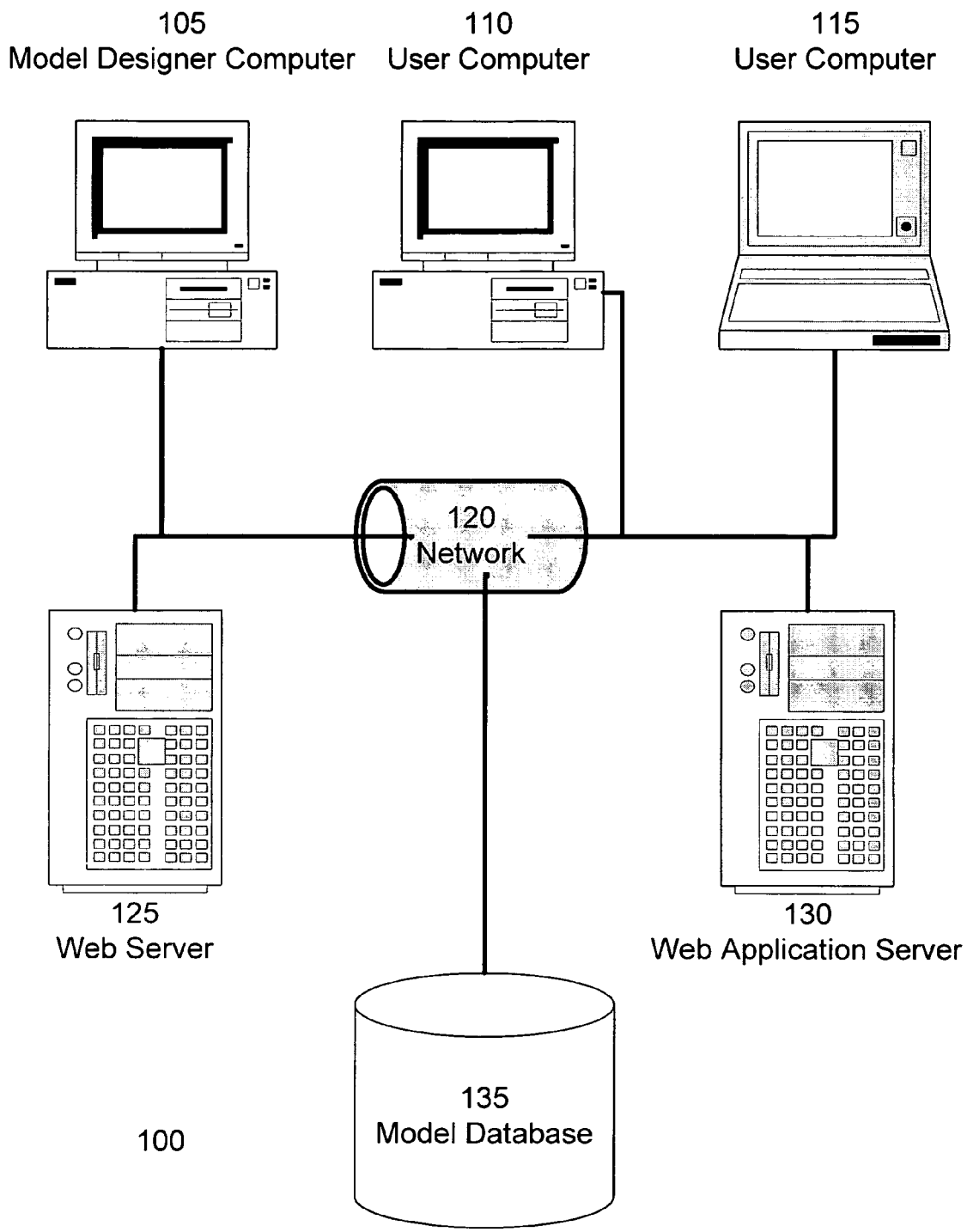
FIG. 1 illustrates a example system suitable for implementing an embodiment of the invention.

FIG. 1 illustrates a system 100 for implementing the web front-end 240 according to an embodiment of the invention. In this embodiment, system 100 includes a model designer computer 105. Model designer computer 105 can be a general purpose personal computer having a spreadsheet application, for example Microsoft Excel™, for creating a spreadsheet model. Model designer computer 105 can also include other software applications, such as web browsers, word processors, and/or web page design application, used to create the spreadsheet model and any associated templates.

System 100 also includes user computers 110 and 115. User computers 110 and 115 can be general purpose personal computers having web browser applications. Alternatively, user computers 110 and 115 can be any other electronic device, such as a thin-client computer, Internet-enabled mobile telephone, or personal digital assistant, capable of displaying and navigating web pages or other types of electronic documents. Although system 100 is shown with two user computers, any number of user computers can be supported.

A web server 125 is used to process requests for web pages or other electronic documents from user computers 110 and 115. In an embodiment of the invention, all model user interaction with the web front-end 240 is via web pages sent to user computers via the web server 125. In a further embodiment, the model designer computer 105 transfers the completed spreadsheet model to the web front-end generator via a web page provided by the web server 125.

Web front-end server 130 operates the web front-end. In an embodiment, the web front-end server 130 is a general purpose computer capable of executing programs or scripts in response to the user computers 110 and 115, as well as model designer computer 105. The web front-end 240 can be implemented as one or more scripts or programs written in any programming language, such as Java™, C, or C++, or any scripting language, such as Perl, Python, or TCL.

In an embodiment, the web front-end server 130 dynamically creates web pages for collecting input data and displaying output data. The web pages created by the web front-end server 130 are forwarded to the user computers via web server 125. Similarly, web server 125 receives web page requests and input data from the user computers 110 and 115, and forwards the web page requests and input data to web front-end server 130.

As the web front-end 240 on web front-end server 130 processes model data and user computer requests, model data can be stored or retrieved from model database 135. Model database 135 stores the model and its associated data objects, such as calculator objects, and the set of cell objects. Model database 135 also stores model data values associated with each model instance of the web front-end 240 and reports created by the model application. In an embodiment, the web front-end 240 on the web front-end server 130 can retrieve any previously stored data, including models, model data, and reports from the model database 135 at any time. This allows model users to modify or update model data, and further permits managers and model designers to analyze model data.

An electronic communication network 120 enables communication between computers 105, 110, and 115, web server 125, web front-end server 130, and model database 135. In an embodiment, network 120 may further include any form of electrical or optical communication devices, including wireless and wired networks. Network 120 may also incorporate one or more local-area networks, such as an Ethernet network; wide-area networks, such as the Internet; and virtual networks, such as a virtual private network.

The system 100 is one example of executing a software application for visualizing visitor usage information according to an embodiment of the invention. In another embodiment, web front-end server 130, web server 125, and optionally model database 135 can be combined into a single server computer system. In alternate embodiment, all or a portion of the web front-end functions may be integrated into an application running on the model designer computer or the user computer. For example, the web front-end generator can be integrated into a spreadsheet application on the model designer computer. In another example, a Java™ or JavaScript™ application on the user computer is used to compute model data or display portions of the web front-end.

Figure 2:
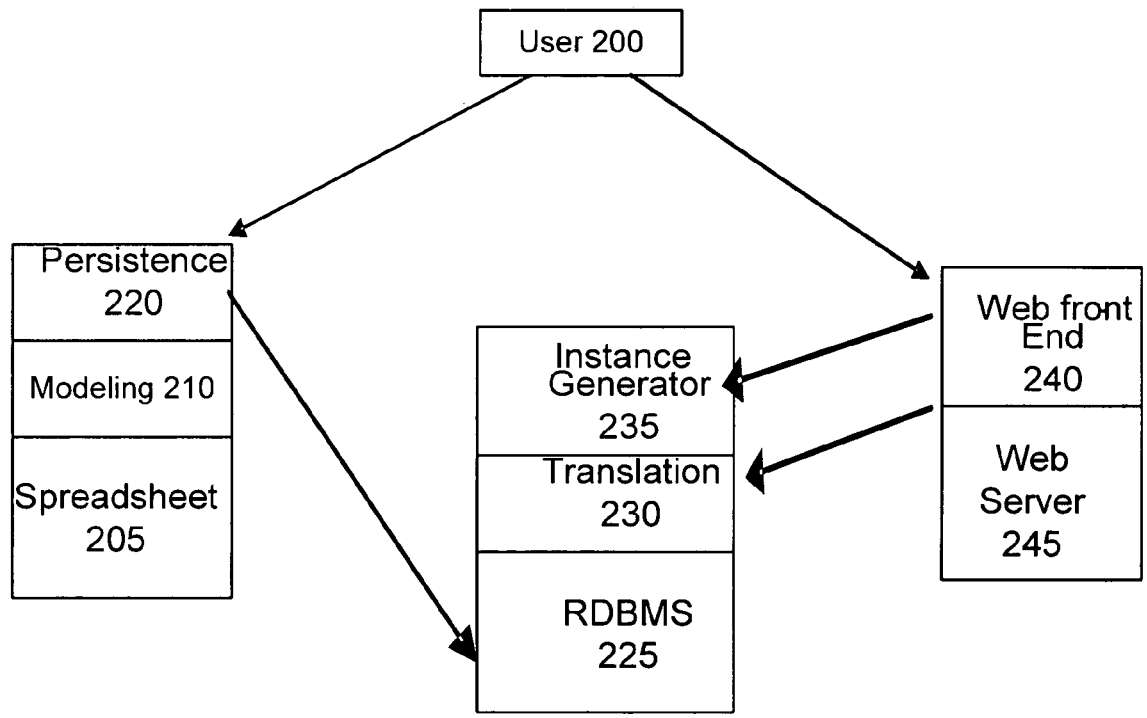
FIG. 2 illustrates the different components of an embodiment of the invention.

FIG. 2 shows the organization of the components of an embodiment of the invention. In this embodiment, a model designer user 200 creates a model using a spreadsheet application 205, for example Microsoft Excel or any other spreadsheet application. The spreadsheet application 205 can be hosted on the computer of the model designer user 200 or on another computer connected via a data network.

The spreadsheet application 205 is interfaced with a modeling add-on component 210. The modeling add-on component 210 allows users to model using a sample of data from a relational database. The imported data can be filtered using spreadsheet application's 205 advanced filtering criteria. Users can then create models on the sample data using the usual spreadsheet formulas. The modeling component 210 uses spreadsheet named ranges to bridge the positional aspects of spreadsheet application 205 to the relational model of a relational database 225.

The spreadsheet application 205 is also interfaced with a persistence component 220. The persistence component 220 persists metadata about the imported and filtered data in the spreadsheet application 205. The persistence component also persists the model created by the user 200 in the spreadsheet application 205, which includes the user-defined formulas and additional data values. The persistence component 220 stores this metadata in the relational database 225.

A spreadsheet to SQL translator 230 is interfaced with the relational database 225. The translator 230 reads from the relational database 225 the stored metadata representing the model, for example the user-defined formulas and additional data, and translates them to one or more SQL spreadsheet queries. This translation allows a relational database to understand the computational model created by the user 200 in the spreadsheet application 205.

After a model designer has persisted a spreadsheet model, model users can create separate instances of the spreadsheet model with their own model data. This allows users to execute a copy of the model with their own specific inputs and outputs.

In an embodiment, a web front-end 240 allows a model user to view and manipulate data in the model. When a model user accesses the model for the first time, the instance generator 235 creates a new instance of the model to store the model user's specific inputs and outputs. The instance generator 235 can create additional instances of the model to store additional sets of model data for a model user. Values that are computed from formulas can be viewed, and the input values to those formulas can be edited. Furthermore, the model users do not require an spreadsheet application (or the expense of its associated license) to view and manipulate the model.

In an embodiment, the web front end 240 creates a web page, which is then sent to a model user's web browser by web server 245. The web server 245 may be hosted on a separate system than the model user's web browser. In response to a model user request, the web server 245 accesses the instance generator 235 to create a new instance of the model. The web server 245 also accesses the translator 230 to store model user inputs values for a model user's instance of the model, to compute the results of formulas from the model user's input values, and to retrieve model outputs for the model user's instance.

Thus, the system of FIG. 2 allows model designer users to create computational models in the spreadsheet application 205 on data stored in a relational database. A user 200 can import a sample of the data from the relational database 225 into the spreadsheet application 205 via the modeling component 210. The sample data may only be a small portion of the data stored in the relational database 225. The model designer user 200 creates the model computations on the sample data and persists to the relational database 225. Once persisted in the relational database 225, the model computations can be applied to the entire table or set of data in the relational database 225 as a SQL query. This embodiment of the invention also allows model users to view the result of the computation from a web front-end 240.

The modeling and persistence component 210 is an add-on to a spreadsheet application. Model designer users 200 can import and filter database data using the modeling add-on. Model designer users 200 can write formulas using the imported data as well as user-entered spreadsheet data in the manner typically used in spreadsheet applications. The Model designer users 200 can then save the model to the database using the persistence add-on 220. The persistence component 220 stores the formulas defining the model to the relational database 225, as well as information about the imported and filtered data. The translation component 230 translates this stored spreadsheet model into a relational SQL statement, or clause, and stores the clause in the database as well.

When a model user wants to view or manipulate the model from the web, the web front-end 240 generates an instance of the model. In an embodiment, the instance generator 235 is interfaced with the relational database 225. It uses the stored SQL MODEL clause to generate a view of the database data for a particular instance. Then the web front-end 240 reads the data from the view, and displays to the model user. For example, cells containing numeric values are rendered as inputs. The model user can change these values and recompute the spreadsheet. When they recompute the spreadsheet, the values are stored to the database and the view is recomputed.

The implementation of the components of this embodiment of the invention are discussed in more detail as follows. In an embodiment, the modeling component 210 is an spreadsheet add-on written in VBA (Visual Basic for Applications). This component 210 allows users to import a sample of data from a relational database 225. The imported data can be filtered using spreadsheet's 205 advanced filtering criteria. Users can then create models on the sample data using the spreadsheet formula capabilities built into the spreadsheet application 205.

To import data from a relational database 225, a user specifies a name for the imported data, a sample size, and a SQL query. Based on the sample size and SQL query, a portion of data from the relational database 225 is imported into the currently opened workbook in the spreadsheet application 205. The cell range containing that data is named by the name provided, using spreadsheet's named cells capability. The named cells capability allows the spreadsheet application 205 to access cells by referencing a name, rather than row and column information. Further, each column of the imported data is given a name based on the provided name and the column name for the data from the database 225 (name column).

For instance, a user might want to import a sample of 10 rows from the sales table, and call the range "sales". In this case, the user would provide the data:

Sample size: 10
Name: sales
SQL Query: select*from sales

Continuing with this example, suppose that the sales table in the database 225 contained columns called ID, PRODUCT, REGION, QTY, LIST_PRICE, and SUBTOTAL. Then the import would create a named range "sales" for the entire range of data, as well as named ranges "sales.id", "sales.product", "sales.subtotal", etc. Each named range in the spreadsheet application 205 corresponds to one of the columns in the sales table in the database 225. In creating the model, model designer users 200 can refer to the data in the subtotal column (as an aggregate) as "sales.subtotal". To sum up all of the sales data, the model designer user 200 could enter the spreadsheet formula "=sum(sales.subtotal)" into a cell of the spreadsheet in the spreadsheet application 205. Within the spreadsheet, this formula would compute the sum for the imported sample data.

Model designer users 200 can also filter imported data, using criteria supported by spreadsheet's advanced filtering feature. To filter data, the user 200 supplies a name for the filtered data, the named range to filter, the criteria to filter by, and a location to store the filtered data. This is similar to the spreadsheet applications 205 advanced filtering mechanism, except that the input data must be a named range from either imported data or previously filtered imported data. The input range is filtered according to the specified criteria, and the output cell range is given the specified name. In addition, each column in the output range is given a name (name column) as described above.

For example, a model designer user 205 might want to filter the imported sales data to only include sales for EMEA region (that is, rows where REGION="EMEA"), and call the resulting data "EMEASales". After applying this filter, the user 200 can sum up the subtotals for all EMEA sales with the formula "=sum(EMEASales.subtotal)". In the spreadsheet application 205, this formula will show the sum of the EMEA data in the sample.

Another feature supports pivot operations, like the spreadsheet pivot table feature. This allows model designer users 200 to compute aggregate functions on the data in a range, grouped by a particular column's value. This is similar to a GROUP BY clause in SQL. This allows, for example, a user 200 to compute sales subtotals for each region.

After importing, filtering and pivoting data, the model designer user 200 can apply aggregate functions to the data by using the range names. When the model is persisted in the database 225 and executed, the same functions defined in the model in the spreadsheet application will be applied to the entire data set in the database 225. In other words, the execution of the model will behave as if the entire table were imported rather than just a sample. Continuing with the example discussed above, the formula "=sum(sales.subtotal)" statement in the spreadsheet would be executed in the database to compute the sum of all subtotals in the sales table, not merely the 10 entries selected as the sample size.

The persistence component 220 persists information about the imported and filtered data, and the additional formulas and data values in the spreadsheet. It also keeps track of all the named ranges created by the user, corresponding SQL, and its location. When a model designer user persists a model, several steps take place:

1. A new spreadsheet entry is inserted into the spreadsheets table. The title of the model is the name of the persisted file, and the owner is the Windows username that the file belongs to.
2. Each cell in the spreadsheet that was not imported from a database is persisted to the cells table. The location, formula, and value of the cell are stored.
3. Each named range that was created by importing or filtering data is persisted. For imports, the name and SQL query are stored. For filtered data, the name, parent data (the named range that was filtered), and the SQL condition are stored. The SQL condition is computed from the Spreadsheet filter criteria. Some additional data is persisted that allows the state of the Spreadsheet to be recreated from the database.
4. The Spreadsheet to SQL translator 230 is invoked.

As discussed above, the spreadsheet to SQL translator 230 reads the persisted formulas and import/filter data, and translates it to a SQL spreadsheet query. In an embodiment, the translator 230 is implemented as a Java stored procedure. After a spreadsheet model is persisted, the persistence component 220 invokes the translator 230. The translator 230 reads and parses the cell formulas, and named range information, and generates a SQL spreadsheet query that represents the formula computation. The generated query is not a complete query, because the full query depends on the values stored for a particular spreadsheet instance. This partial query is stored in the spreadsheet_view_text table, which is discussed below with reference to FIG. 3. This allows for reusability of the generated SQL to prevents reparsing when another user requests an instance of the model. The translation from spreadsheet formulas to a SQL spreadsheet query is described in more detail below.

After a model designer has persisted a spreadsheet model, other model users can create an instance of the spreadsheet. Initially an instance of the spreadsheet contains all of the data entered by the model designer, and the computed values from the formulas in the model. Then the model user can replace input values in the model and recompute the computed values of the model.

In an embodiment, the instance generator 235 is implemented as a Java stored procedure in the relational database 225. Creating an instance involves the following steps:
1. Insert a row into spreadsheet_instances, containing the title and owner, and which spreadsheet it is an instance of.
2. Create entries in cell_values for each cell in the spreadsheet. The values of the cell_values initially are the default_value for the corresponding cell.
3. Create a view containing the SQL MODEL clause to compute the formulas. The partial SQL query for the spreadsheet is retrieved, and used to create a view specifically for the instance.

The web front-end 240 allows an instance user to view and manipulate data in the model using a web browser. Values that are computed from formulas can be viewed, and the input values to those formulas can be edited. This allows users to edit input values without any potential for changes to the underlying model (formulas) being introduced. Furthermore, the model user does not require an spreadsheet license to view and manipulate the model. In an embodiment, the web front-end 240 is implemented as a JSPs and Java classes.

The web front-end 240 allows a user to create an instance of a spreadsheet model. Once the instance is created, the sheets of the instance are rendered as a sequence of pages. Each sheet shows a two-dimensional grid containing the cells from that sheet. Numeric input values (cells containing no formula) are rendered as text input boxes. Users can enter new data values and recompute the model. When a user enters a new value, the value in cell_values is updated.

Figure 4:
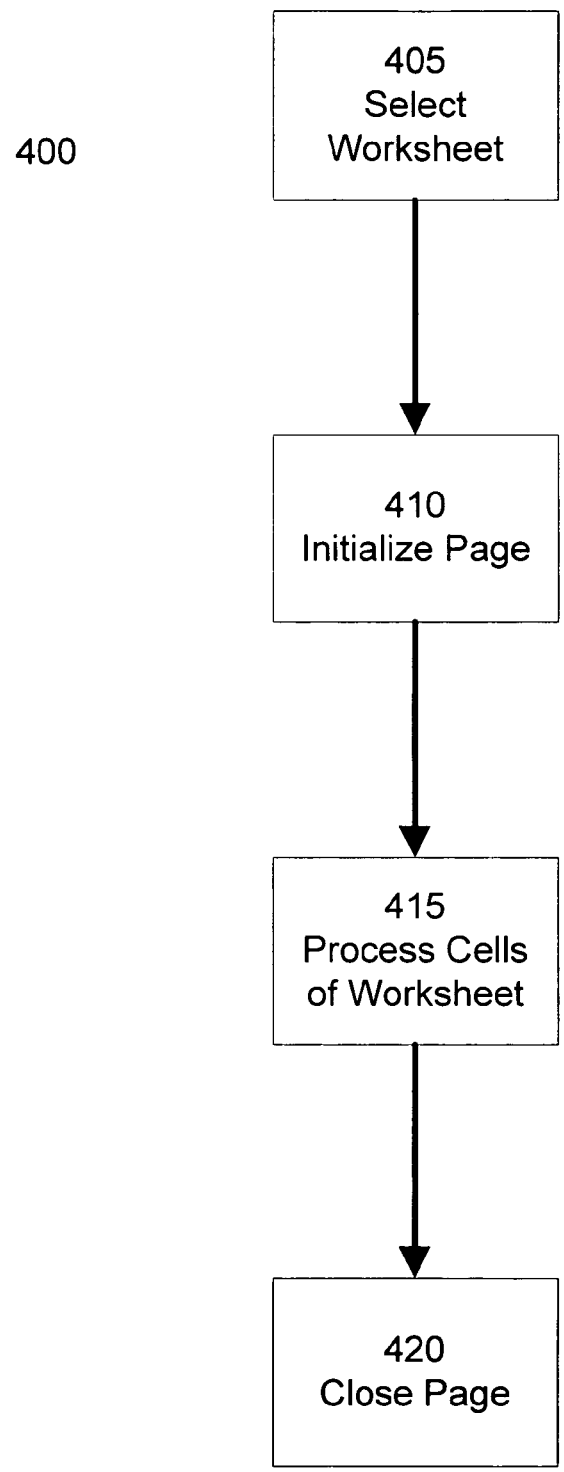
FIG. 4 illustrates a method for displaying a model as a web page according to an embodiment of the invention.

FIG. 4 illustrates a method 400 of creating a web page display of a model according to an embodiment of the invention. At step 405, the web front-end 240 selects a worksheet for display as a web page. Step 405 includes selecting a worksheet from the model, the cell value instances for the cells on the worksheet, and the corresponding set of cell objects associated with the cells on the worksheet. In an embodiment of the invention, worksheets in the model are processed sequentially to provide a guided data entry process to model users.

At step 410, the web front-end 240 initializes the page for display. Step 410 creates an HTML format source file and includes HTML source code for any headers, title bars, menus, status information, navigation controls, and/or other page attributes, such as fonts, colors, and backgrounds.

Typically, the order of HTML elements in an HTML source file determines the relative display position of these elements. An embodiment of method 400 creates an HTML source file by generating the source code for HTML elements in the order they are to be displayed, thereby "drawing" the page in the HTML format source file. In this embodiment, step 410 creates HTML source code for the top portion of a page, above the portion of the page displaying the model.

The web front-end 240 renders the model as a web page. In an embodiment, the web front-end 240 processes the cells in the view. For each cell in the model, the layout manager retrieves the cell value and a corresponding cell object from the appropriate table. The web front-end 240 then invokes the cell object with the cell value to produce the display information determining the appearance of the cell.

In an embodiment, each cell object has a method creating HTML source code for displaying the cell. This method is invoked with the cell value to create the HTML source code for the cell displaying the cell value. In this embodiment, the web front-end 240 processes cells in the order they are to be displayed on the desired web page, so that the HTML source code of each cell is automatically located in the proper position on the page. The web front-end 240 may further insert additional HTML source code for page navigation (e.g. between screens of a wizard), status information, headers and/or footers, and initialization and/or closing the web page.

At step 415, the web front-end 240 processes the cells of the selected worksheet and creates HTML source code for displaying the cells on the web page given the cell values of a particular model instance. As discussed above, each cell on the worksheet is associated with a cell object and a cell value instance. The cell object includes a display method for creating HTML source code to display the cell, and the cell value instance includes the actual value of the cell. The web front-end 240 invokes each cell object's display method together with its cell value instance to create HTML source code for displaying the cell. The HTML source code associated with each cell is then added to the HTML format source file, so that the cells are integrated into the final web page.

An embodiment of step 415 processes the cells of the selected worksheet in the order that they are to be displayed. For example, step 415 processes cells in rows from left to right, and processes rows of cells from top to bottom. For each cell, step 415 invokes the display method of the associated cell object and then integrates the resulting HTML source code into the HTML format source file. In a further embodiment, step 415 also creates additional HTML source code to more precisely define the position of cells on the page. For example, step 415 can create an HTML table that arranges the cells in regular rows and columns.

Following the completion of step 415 for all of the cells on the selected worksheet, at step 420 the web front-end 240 closes the page. Step 420 adds HTML source code to the HTML format source file to complete the web page. Step 420 can optionally add footers, menus, status information, navigation controls, and/or other additional user interface controls to the page. In an embodiment, step 420 adds HTML source code for any HTML elements positioned on the portion of the page located below the cells of the worksheet. Step 420 then communicates the completed HTML format source file to the model user's web browser for display.

Figure 3:
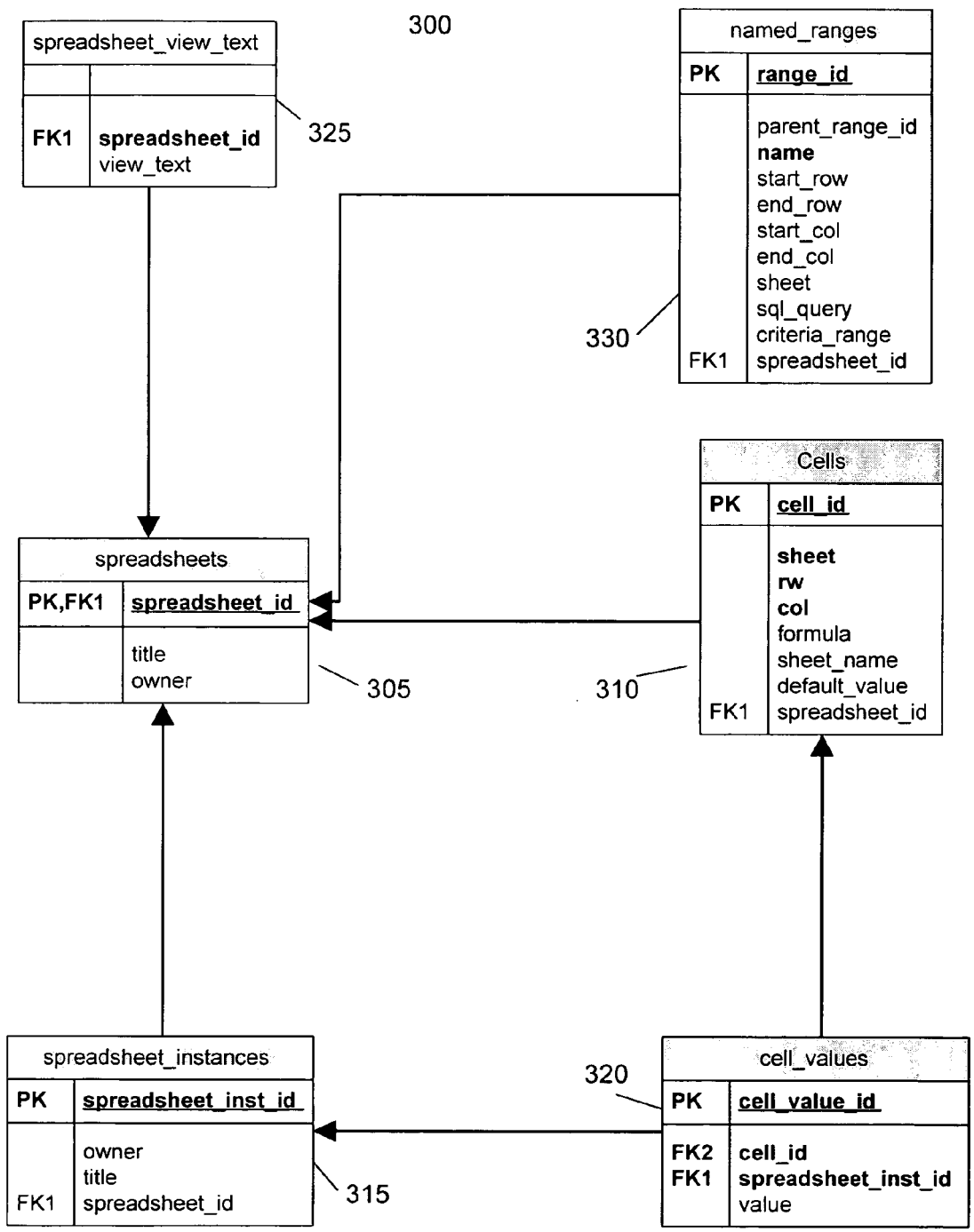
FIG. 3 illustrates the database tables used as a data model for an embodiment of the invention.

FIG. 3 shows an ER diagram of the database schema 300 used to store the model in the relational database 225. The schema 300 consists of the following tables:

spreadsheets 305—contains title and owner of a spreadsheet and a synthetic primary key cells 310—stores the cells of a spreadsheet, including the location (sheet,rw,col), what spreadsheet it belongs to (spreadsheet_id), the name of the sheet the cell is on, the formula in that cell, the default value (value in the Spreadsheet when the cell is persisted), and a synthetic primary key spreadsheet_instances 315—contains title and owner of a spreadsheet instance, a reference to the spreadsheet it is an instance of, and a synthetic primary key cell_values 320—contains a reference to the instance containing the value, the cell the value represents, the value, and a synthetic primary key spreadsheet_view_text 325—contains the SQL MODEL clause to compute the formulas for a spreadsheet named_ranges 330—stores information about imported and filtered data (described in Modeling section). sql_query contains the query or clause corresponding to the import or filter, and parent_range_id specifies the base data that is filtered, in the case of a filter.

The translation between the spreadsheet formulas and the SQL statement used by the database to execute the persisted model is done using a number of different algorithms, depending on the type of formula used in the spreadsheet model and the capabilities of the database. In an embodiment, the database supports the use of an SQL "MODEL" clause in SQL SELECT statements. For basic spreadsheet functions, each cell in a spreadsheet is stored to a table by the spreadsheet add-on, which stores the location and formula or value of the cell. When an instance of the spreadsheet is created, a cell value corresponding to each cell is created. A view is generated which computes the values of the cells, as a MODEL clause dimensioned on the sheet, row and column of the cells. The MODEL clause's measure is the value in the cell, which defaults to the stored cell value in the case of a cell containing a constant. For cells containing formulas, an update rule encodes the computation necessary for that cell.

For example, a spreadsheet has the formula:

| A |
| --- |
| 1  1 |
| 2  2 |
| 3  = A1 + A2 |

When this spreadsheet is persisted, three cells are stored to the cells table. Since A1 and A2 contain constants, the SQL spreadsheet query will not contain an update rule for those cells. For A3, an update rule is present:

```
spreadsheet
dimension by (sheet,rw,col)
measures (value s)
rules (
    s[0,2,0] = s[0,0,0] + s[0,1,0]
)
```

In this example, the MODEL clause is dimensioned by the sheet, row and column attributes of a cell. Thus, s[0,2,0] refers to the value in A3, s[0,0,0] refers to the value in A1, and s[0,1,0] refers to the value in A2. So in the result of executing the query, the cell representing A3 contains the sum of the values in A1 and A2.

Table 1 contains the rules for translation from an spreadsheet formula to a SQL spreadsheet rule. Most of the rules are fairly straightforward, but a few require discussion.

cell_ref —A cell reference is computed by looking up the measure's value by the indices of the cell reference. The translated spreadsheet query uses AUTOMATIC ordering for rule execution, so the value at that reference is computed before the lookup takes place. The helper functions sheet, row, and column return a zero-based index for the corresponding dimension of the reference. For example, sheet(Sheet1!A1)=0 (where Sheet1 is the first sheet)

row(Sheet1!A1)=0 column(Sheet1!A1)=0 cell_range and cell_range_in_list—The translation of a cell range reference depends on the context that that cell range appears in. If a cell range appears in an aggregate function, then those cells are expanded into a set of rows that a SQL aggregate function is applied to. If a cell range appears as an argument to any other function, then the cell range is expanded into a list of cells (e.g. "A1:A3" expands to "A1,A2,A3"), and then the function is translated.

*junction—There are three different rewrite rules for functions:

Some Spreadsheet functions correspond to SQL aggregate functions. These rules must be translated to aggregate over a set of rows in the SQL query, and are translated according to aggregate_function.

Other Spreadsheet functions correspond directly to SQL functions. For instance, the Spreadsheet function INT (x) corresponds directly to SQL TRUNC(x). These functions are translated according to other_function.

Some Spreadsheet functions do not translate to SQL functions, but to infix SQL operators. For instance, PRODUCT( . . . ) translates to the infix operator *. These functions are translated according to operator_function.

Some functions can act as aggregates or non-aggregates. For instance, SUM(A1:F1) is an aggregate, but SUM (1,2,3) is not. In the former case (when there is a single argument that is a cell range), the aggregate translation is used. In the latter case, the infix operator + is used to translate SUM.

Some other helper functions are used in the rules:

sqlFcn(spreadsheetFcnName) returns the name of the SQL function corresponding to the specified Spreadsheet function.

op(spreadsheetFcnName) returns the SQL infix operator corresponding to the specified Spreadsheet function.

TABLE 1

Spreadsheet to SQL Translation Rules

| Spreadsheet Expression | Expression Type |
|---|---|
| R[ e1 op e2 ] = R[e1] op R[e2] | [operator] |
| R[ const ] = 'const' | [const] |
| R[ cellRef] = s[sheet(cellRef), row(cellRef), column(cellRef)] | [cell_ref] |
| R[ cellRef1 : cellRef2 ] = s[ sheet(cellRef1), rw between row(cellRef1) and row(cellRef2), col between column(cellRef1) and column(cellRef2) ] | [cell_range] |
| R[ fcnAgg ( cellRef1 : cellRef2 ) ] = sqlFcn(fcnAgg) ( s ) [ sheet(cellRef1), rw between row(cellRef1) and row(cellRef2), col between column(cellRef1) and column(cellRef2) ] | [aggregate_function] |
| R[ fcnOp ( e1 , e2 , ... ) ] = R[ e1' ] op(fcnOp) R[ e2' ] op(fcnOp) ... where R[ e1, e2, ... ] = (e1', e2', ... ) | [operator_function] |
| R[ fcn ( exprList ) ] = sqlFcn(fcn) ( R[ exprList ] ) | [other_function] |
| R[ e1 , e2 , ... ] = L[e1] , L[e2] , ... | [expr_list] |
| L[ cellRef1 : cellRef2 ] = s [ cellRef1 ] , ... , s [ cellRef2 ] | [cell_range_in_list] |
| L[ e ] = R [ e ] , where e is not a cell range | [other_expr_in_list] |

Vlookup is another type of spreadsheet function that can be translated into SQL by an embodiment of the invention. A Vlookup is a spreadsheet function that supports content-addressable memory, similar to a hash coded table. A user specifies a range of cells, which column to lookup, and the key value to match against. The key value is matched against the first column (the key column), and the corresponding value (in the same row) in the lookup column is returned.

There is no simple translation from vlookup to a SQL function, so the basic translation is not useful. Vlookups are, however, very similar to a SQL select statement. This means we can use SQL spreadsheet's reference spreadsheets to implement vlookup. The translation of a vlookup results in a SQL reference spreadsheet like:

```
reference vlookup_ref on
  (select k.default_value key, v.default_value value
    from cells k, cells v
    where k.col = <start_column>
      and v.col = <start_column>+<column_offset>-1
      and k.rw >= <start_row>
      and k.rw <= <end_row>
      and k.sheet = <sheet>
      and v.sheet = <sheet>
      and v.rw = k.rw
      and k.spreadsheet_id = <spreadsheet_id>
      and v.spreadsheet_id = <spreadsheet_id> )
dimension by (key) measures (value)
```

In other words, the key is in the first column of the range (start_column), the value is in the lookup column, the key and value are in the same row on the same sheet, and that row is in the specified range (start_row to end_row). This reference spreadsheet creates a mapping from keys (first column values) to values (lookup column values). Any vlookups over the specified range, on the specified lookup column, with key value K is translated to:

vlookup_ref.value[K]

Vlookup translation is different from the basic translation, because the spreadsheet function is not just translated to a SQL spreadsheet rule. It is translated to a reference spreadsheet and a rule. This translation only works for vlookup's on static data. That is, since the key and value are the default values from the cells (rather than the value from the cell values), changes in the referenced data are not reflected in the vlookup.

In a further embodiment, the reference data could potentially include formulas that reference other data in the spreadsheet. This embodiment requires that the reference spreadsheet pull in the SQL rules corresponding to those formulas and any dependent cells.

As discussed above, one of the features of the present invention is the ability to build a spreadsheet model using only a small portion, or sample, of the data set in the database, and then automatically scale the completed model to operate on the full data set. This translation between sample data and corresponding full data sets is performed as follows.

As discussed above, the modeling tools introduce named references for cells and cell ranges. When the spreadsheet model is persisted into the database, the persisted functions include the named references of the named ranges imported and filtered by the modeling tools. Because these named ranges represent data from external tables, a SQL reference spreadsheet is an appropriate representation.

For example, suppose sample data were imported from the SALES table, and the user summed up the subtotals for all of the entries in the sales table. This corresponds to an spreadsheet formula:

=SUM(sales.subtotal)

This could be translated to a SQL reference spreadsheet:

reference named_range on (select id, s from sales)
dimension by (rownum id)
measures (subtotal s)
The formula would be represented as an update rule:
   . . . =sum(named_range.s)[ANY]

In an embodiment, SQL spreadsheets do not support aggregate functions over reference spreadsheet data. To compensate, an embodiment includes the aggregate clause as part of the MODEL clause. There are a variety of ways to translate this, each with performance tradeoffs. One implementation of this translation is

```
reference named_range on
(select t,s from
    (select id, t, s
        from (select * from sales)
        spreadsheet
        dimension by (rownum id, −1 as t)
        measures (1 s,subtotal s1)
        rules (
            s[NULL,0] = SUM(s1) [ANY,−1]
        )
    ) where id is null
)
dimension by (t) measures (s)
```

In this implementation, the reference spreadsheet is on a query that itself contains a MODEL clause. The idea behind this translation is that the desired column (subtotal) is one measure, and another measure contains the computed aggregate. The column t is a dummy column to keep track of whether the value is a computed aggregate or a value from the sales table. The aggregate functions are computed by update rules for NULL rownum, and then only these values are selected by the outer query. The result of this reference spreadsheet is a mapping from 0 to the sum over all subtotals in sales.

Continuing with this example, the formula would be represented as an update rule:
   . . . =named range.s[0]

This translation allows us to include multiple aggregate functions over the same column of the same named range to be represented by one reference spreadsheet. For instance, consider a spreadsheet model that contains the following formulas:

=sum(sales.subtotal)
   =count(sales.subtotal)
   =average(sales.subtotal).

This can be translated to the reference spreadsheet below:

```
reference named_range on
(select t,s from
    (select id, t, s
        from (select * from sales)
        spreadsheet
        dimension by (rownum id, −1 as t)
        measures (1 s,subtotal s1)
        rules (
            s[NULL,0] = SUM(s1) [ANY,−1],
            s[NULL,1] = COUNT(s1) [ANY,−1],
            s[NULL,2] = AVG(s1) [ANY,−1]
        )
    ) where id is null
)
dimension by (t) measures (s)
```

The three formulas would be translated to:

. . . = named_ranges[0]
   . . . = named_ranges[1]
   . . . = named_ranges[2]

This translation is more efficient than other options in cases when the select query takes time, because it only needs to be executed once. This could be the case since the user can specify any SQL query for a data import.

This translation can be extended to support aggregates on different columns in the same import or filter, by adding a measure per column to the inner MODEL clause, e.g.:

```
...
measures (1 s,subtotal s1, id s2)
rules (
    s[NULL,0] = SUM(s1) [ANY,−1],
    s[NULL,1] = COUNT(s2) [ANY,−1]
...
```

This MODEL clause can be used to represent both =SUM (sales.subtotal) and =COUNT(sales.id) in one reference spreadsheet, which means the select query (select * from sales) only needs to be executed once.

In addition to the above discussed trade-offs in the translation of named ranges, there are other optimizations to the translation. First, when two spreadsheet formulas are equivalent to each other in the relative references that they have, the formula can be encoded as one rule. For example, consider the following spreadsheet:

|   | A | B     |
|---|---|-------|
| 1 | 1 | =A1*5 |
| 2 | 2 | =A2*5 |
| 3 | 3 | =A3*5 |

This spreadsheet would be translated into a SQL MODEL clause with three rules, one per formula. In fact the three formulas are equivalent, given that the cell references are relative. These three rules can be replaced by one rule instead:
s[0, for rw from 0 to 2 increment 1, 1]=s[0, currentv( )−1, 0]

An embodiment of the invention uses this optimization to coalesce equivalent formulas in a contiguous range of cells (in a row or column). It also reduces the size of the view generated for each instance.

Second, if the initial translation expanded a cell range to
   s[ . . . , rw between . . . , col between . . . ]

This caused performance problems, since between results in a scan of all data. An embodiment of the invention uses the for looping construct instead.

Although the invention has been discussed with respect to specific embodiments thereof, these embodiments are merely illustrative, and not restrictive, of the invention. For example, although the invention is discussed with reference to financial models, the invention can be used to implement a web front-end 240 from any use of a spreadsheet application.

In a further embodiment of the invention, the display methods associated with the cell objects can be interfaced with XML documents, XForms documents, or other formats of electronic documents. Thus, the scope of the invention is to be determined solely by the claims.

What is claimed is:

1. A computer-implemented method for querying a database, the computer-implemented method comprising:
    importing a set of sample data from a database into a spreadsheet application;
    associating a set of spreadsheet operations comprising a spreadsheet model with the set of sample data;
    translating the set of spreadsheet operations into a model database query, such that the model database query performs the set of spreadsheet operations on a full data set in the database, and
    performing the model database query on the full data set in the database.

2. The method of claim 1, wherein the sample data is a copy of a portion of the full data set.

3. The method of claim 2, wherein translating comprises matching the set of sample data to a second database query defining the full data set within the database.

4. The method of claim 1, further comprising creating a web page from results of the model database query on the database.

5. The method of claim 1, wherein importing the set of sample data comprises:
    receiving a database query specifying the full data set in the database;
    receiving a sample size value; and
    querying the database to retrieve the set of sample data corresponding to a portion of the full data set and having a size of the sample size value.

6. The method of claim 5, further comprising:
    receiving a name for the set of sample data; and
    associating the name with the set of sample data.

7. The method of claim 6, wherein the set of sample data includes a plurality of sample data subsets, each sample data subset corresponding to a subset of the full data set.

8. The method of claim 7, wherein associating the name with the set of sample data includes associating the name and a subset name derived from the corresponding subset of the full data set with each of the plurality of sample data subsets.

9. The method of claim 6, wherein, in associating the set of spreadsheet operations with the set of sample data, the set of spreadsheet operations includes references to the name associated with the set of sample data.

10. The method of claim 9, wherein translating comprises matching the set of sample data to the database query defining the full data set within the database using the name associated with the set of sample data for each of the set of operations.

11. A computer-implemented system for querying a database, the computer-implemented system comprising:
    a processor;
    a storage coupled to the processor;
    a modeling module, stored in the storage, interfacing with a spreadsheet application and retrieving a set of sample data from a database, wherein the set of sample data corresponds with a portion of a full data set within the database;
    a persistence module, stored in the storage, interfacing with the spreadsheet application and storing a set of spreadsheet operations referencing the set of sample data in the database; and
    a translation module, stored in the storage, translating the set of spreadsheet operations into a model database query, such that the model database query performs the set of spreadsheet operations on the full data set in the database.

12. The system of claim 11, wherein the translation module further stores the model database query in the database.

13. The system of claim 11, wherein the modeling module associates a name and a database query specifying the full data set within the database with the set of sample data.

14. The system of claim 13, wherein the set of spreadsheet operations include a reference to name associated with the set of sample data; and
    wherein the translation module further matches the name associated with the set of sample data with the database query specifying the full data set and creates a model database query applying the set of operations to the full data set specified by the database query.

15. The system of claim 11, further comprising:
    an instance generator creating an instance of a model from the model database query and storing the instance of the model and a set of model input data in the database.

16. The system of claim 15, wherein the instance generator stores a set of output data resulting from an execution of the model database query on the set of model input data in the database.

17. The system of claim 16, wherein the instance generator receives the set of model input data from a model user application.

18. The system of claim 17, further comprising:
    a web front-end creating a web page from results of the model database query on the database; and
    wherein the model user application is a web browser.

19. The system of claim 18, wherein the web page includes a user interface collecting the set of model input data from a model user.

20. The system of claim 11, wherein the model database query is an SQL MODEL rule.

* * * * *

UNITED STATES PATENT AND TRADEMARK OFFICE
CERTIFICATE OF CORRECTION

PATENT NO. : 7,299,223 B2  Page 1 of 1
APPLICATION NO. : 10/893547
DATED : November 20, 2007
INVENTOR(S) : Naimat et al.

It is certified that error appears in the above-identified patent and that said Letters Patent is hereby corrected as shown below:

Title page;

(12) Replace [Namait] with -- Naimat --.

(75) Replace [Namait] with -- Naimat --.

Signed and Sealed this

Eleventh Day of March, 2008

JON W. DUDAS
*Director of the United States Patent and Trademark Office*

UNITED STATES PATENT AND TRADEMARK OFFICE
CERTIFICATE OF CORRECTION

PATENT NO. : 7,299,223 B2  Page 1 of 1
APPLICATION NO. : 10/893547
DATED : November 20, 2007
INVENTOR(S) : Namait et al.

It is certified that error appears in the above-identified patent and that said Letters Patent is hereby corrected as shown below:

In column 1, line 33, after "from its" delete "from its".

In column 6, line 32, delete "(name column)." and insert -- (name . column). --, therefor.

In column 6, lines 64-65, delete "(name column)" and insert -- (name . column) --, therefor.

In column 11, line 8, delete "*junction" and insert -- *_function --, therefor.

In column 13, line 11, after "is" insert -- : --.

In column 13, line 40, delete "named range." and insert -- named_range. --, therefor.

In column 14, line 12, delete "ranges[0]" and insert -- range.s[0] --, therefor.

In column 14, line 13, delete "ranges[1]" and insert -- range.s[1] --, therefor.

In column 14, line 14, delete "ranges[2]" and insert -- range.s[2] --, therefor.

In column 14, line 63, after "to" insert -- : --.

Signed and Sealed this

Nineteenth Day of August, 2008

JON W. DUDAS
*Director of the United States Patent and Trademark Office*